United States Patent
Bell et al.

(10) Patent No.: US 9,760,994 B1
(45) Date of Patent: *Sep. 12, 2017

(54) BUILDING A THREE-DIMENSIONAL COMPOSITE SCENE

(71) Applicant: Matterport, Inc., Mountain View, CA (US)

(72) Inventors: Matthew Bell, Palo Alto, CA (US); David Gausebeck, Mountain View, CA (US)

(73) Assignee: Matterport, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/292,924

(22) Filed: Oct. 13, 2016

Related U.S. Application Data

(63) Continuation of application No. 14/743,748, filed on Jun. 18, 2015, now Pat. No. 9,489,775, which is a (Continued)

(51) Int. Cl.
*G06K 9/00* (2006.01)
*G06T 7/00* (2017.01)
(Continued)

(52) U.S. Cl.
CPC .............. *G06T 7/0024* (2013.01); *G06T 5/50* (2013.01); *H04N 13/0203* (2013.01);
(Continued)

(58) Field of Classification Search
CPC .................... G06T 7/0024; G06T 5/50; G06T 2207/10024; G06T 2207/10028;
(Continued)

(56) References Cited

U.S. PATENT DOCUMENTS 6,320,979 B1   11/2001   Melen
6,522,787 B1   2/2003    Kumar et al.
(Continued)

OTHER PUBLICATIONS

Office Action for U.S. Appl. No. 14/053,045, dated Jan. 15, 2014, 13 pages.
(Continued)

*Primary Examiner* — Gregory M Desire
(74) *Attorney, Agent, or Firm* — Amin, Turocy & Watson, LLP

(57) ABSTRACT

The capture and alignment of multiple 3D scenes is disclosed. Three dimensional capture device data from different locations is received thereby allowing for different perspectives of 3D scenes. An algorithm uses the data to determine potential alignments between different 3D scenes via coordinate transformations. Potential alignments are evaluated for quality and subsequently aligned subject to the existence of sufficiently high relative or absolute quality. A global alignment of all or most of the input 3D scenes into a single coordinate frame may be achieved. The presentation of areas around a particular hole or holes takes place thereby allowing the user to capture the requisite 3D scene containing areas within the hole or holes as well as part of the surrounding area using, for example, the 3D capture device. The new 3D captured scene is aligned with existing 3D scenes and/or 3D composite scenes.

20 Claims, 3 Drawing Sheets

Related U.S. Application Data continuation of application No. 14/488,459, filed on Sep. 17, 2014, now Pat. No. 9,165,410, which is a continuation of application No. 14/053,076, filed on Oct. 14, 2013, now Pat. No. 8,861,841, which is a continuation of application No. 13/539,252, filed on Jun. 29, 2012, now Pat. No. 8,879,828.

(60) Provisional application No. 61/502,427, filed on Jun. 29, 2011.

(51) Int. Cl.
  *H04N 13/02* (2006.01)
  *G06T 5/50* (2006.01)

(52) U.S. Cl.
  CPC ..... *H04N 13/0257* (2013.01); *H04N 13/0271* (2013.01); *G06T 2207/10024* (2013.01); *G06T 2207/10028* (2013.01); *G06T 2207/20221* (2013.01)

(58) Field of Classification Search
  CPC ...... G06T 2207/20221; H04N 13/0203; H04N 13/0257; H04N 13/0271
  See application file for complete search history.

(56) References Cited

U.S. PATENT DOCUMENTS

| | | |
|---|---|---|
| 6,677,982 B1 | 1/2004 | Chen et al. |
| 6,921,172 B2 * | 7/2005 | Ulichney ................. H04N 5/74 345/596 |
| 7,010,158 B2 | 3/2006 | Cahill et al. |
| 7,034,820 B2 | 4/2006 | Urisaka et al. |
| 7,092,562 B2 | 8/2006 | Viala et al. |
| 7,113,183 B1 | 9/2006 | Collins et al. |
| 7,167,189 B2 | 1/2007 | Di Lelle et al. |
| 7,382,374 B2 | 6/2008 | Majer et al. |
| 7,551,771 B2 | 6/2009 | England |
| 7,787,678 B2 | 8/2010 | Unal et al. |
| 7,889,948 B2 | 2/2011 | Steedly et al. |
| 7,953,301 B2 | 5/2011 | Choi et al. |
| 7,956,842 B2 | 6/2011 | Ting |
| 8,165,370 B2 | 4/2012 | Inoue et al. |
| 8,184,858 B2 | 5/2012 | Caduff |
| 8,203,137 B2 | 6/2012 | Cho et al. |
| 8,294,766 B2 | 10/2012 | Tsai et al. |
| 8,358,840 B2 * | 1/2013 | Bronstein ......... G06F 17/30784 382/168 |
| 8,442,304 B2 | 5/2013 | Marrion et al. |
| 8,526,759 B2 | 9/2013 | Lee et al. |
| 8,928,734 B2 | 1/2015 | Dai et al. |
| 9,171,405 B1 | 10/2015 | Bell et al. |
| 2002/0126138 A1 | 9/2002 | Shekter |
| 2005/0031195 A1 | 2/2005 | Liu |
| 2005/0089213 A1 * | 4/2005 | Geng ................. G06K 9/00214 382/154 |
| 2005/0265598 A1 | 12/2005 | Noguchi et al. |
| 2006/0171586 A1 | 8/2006 | Georgescu et al. |
| 2007/0172985 A1 | 7/2007 | Huang et al. |
| 2007/0237417 A1 | 10/2007 | Agrawal |
| 2008/0201101 A1 * | 8/2008 | Hebert ................. G01B 11/245 702/152 |
| 2009/0148017 A1 | 6/2009 | Inoue et al. |
| 2009/0157649 A1 | 6/2009 | Papadakis et al. |
| 2009/0310828 A1 | 12/2009 | Kakadiaris et al. |
| 2010/0079598 A1 | 4/2010 | Ke et al. |
| 2010/0104184 A1 | 4/2010 | Bronstein et al. |
| 2010/0111370 A1 | 5/2010 | Black et al. |
| 2010/0166294 A1 | 7/2010 | Marrion et al. |
| 2010/0220913 A1 * | 9/2010 | Slabaugh .............. G06T 7/0012 382/131 |
| 2010/0245851 A1 | 9/2010 | Teodorescu |
| 2011/0116707 A1 | 5/2011 | Kim et al. |
| 2011/0235897 A1 | 9/2011 | Watanabe et al. |
| 2012/0306876 A1 | 12/2012 | Shotton et al. |
| 2013/0004060 A1 | 1/2013 | Bell et al. |
| 2013/0335409 A1 | 12/2013 | Yamamoto |
| 2014/0044343 A1 | 2/2014 | Bell et al. |

OTHER PUBLICATIONS

Office Action for U.S. Appl. No. 14/053,076, dated Dec. 19, 2013, 10 pages.
Office Action for U.S. Appl. No. 13/539,252, dated Dec. 31, 2013, 22 pages.
Notice of Allowance for U.S. Appl. No. 13/539,252, dated Jun. 27, 2014, 21 pages.
Notice of Allowance for U.S. Appl. No. 14/053,076, dated Jun. 6, 2014, 25 pages.
Notice of Allowance for U.S. Appl. No. 14/053,045, dated Jun. 5, 2014, 23 pages.
Office Action for U.S. Appl. No. 14/488,459, dated Oct. 6, 2014, 15 pages.
Final Office Action for U.S. Appl. No. 14/488,459, dated Mar. 25, 2015, 17 pages.
Notice of Allowance for U.S. Appl. No. 14/488,459, dated Jun. 10, 2015, 22 pages.
Office Action for U.S. Appl. No. 14/488,541, dated Oct. 9, 2014, 11 pages.
Final Office Action for U.S. Appl. No. 14/488,541, dated Mar. 31, 2015, 17 pages.
Notice of Allowance for U.S. Appl. No. 14/488,541, dated Jun. 23, 2015, 19 pages.
Office Action for U.S. Appl. No. 14/743,748 dated Jan. 14, 2016, 19 pages.
Office Action for U.S. Appl. No. 14/743,748 dated May 9, 2016, 9 pages.
Notice of Allowance for U.S. Appl. No. 14/743,748 dated Jul. 13, 2016, 19 pages.

* cited by examiner

BUILDING A THREE-DIMENSIONAL COMPOSITE SCENE

CROSS-REFERENCE TO RELATED APPLICATION

The present application is a continuation of and claims the priority benefit of each of U.S. patent application Ser. No. 14/743,748, filed Jun. 18, 2015, and entitled, "BUILDING A THREE-DIMENSIONAL COMPOSITE SCENE," which is a continuation of U.S. patent application Ser. No. 14/488,459 (now issued as U.S. Pat. No. 9,165,410), filed Sep. 17, 2014, and entitled, "BUILDING A THREE-DIMENSIONAL COMPOSITE SCENE," which is a continuation of U.S. patent application Ser. No. 14/053,076 (now issued as U.S. Pat. No. 8,861,841), filed Oct. 14, 2013, and entitled, "BUILDING A THREE-DIMENSIONAL COMPOSITE SCENE," which is a continuation of U.S. patent application Ser. No. 13/539,252 (now issued as U.S. Pat. No. 8,879,828), filed Jun. 29, 2012, and entitled "CAPTURING AND ALIGNING MULTIPLE 3-DIMENSIONAL SCENES," which claims the priority benefit of U.S. provisional application No. 61/502,427, filed Jun. 29, 2011, and entitled, "CAPTURING AND ALIGNING MULTIPLE 3-DIMENSIONAL SCENES." The entireties of each of the above mentioned applications are incorporated herein by reference.

BACKGROUND OF THE INVENTION

Field of Invention

The present invention generally relates to the field of 3-Dimensional (3D) capture of the physical world. More specifically, the present invention relates to capturing and aligning multiple 3D scenes with one another as well as extrapolating missing 3D scenes.

Description of the Related Art

While methods for capturing 3D information have existed for over a decade, known methods are typically expensive and require complex hardware such as light detection and ranging (LIDAR) sensors.

The emergence of 3D capture devices that not only capture color but that are also inexpensive, such as the PrimeSense™ Ltd. hardware in Microsoft Corporation's Kinect™, has made it possible for 3D scenes and objects to automatically be reconstructed from multiple 3D captures by non-technical users. Current alignment software, however, is limited in its capabilities and ease of use. Existing alignment methods, such as the Iterative Closest Point algorithm (ICP), require users to manually input an initial rough alignment, which exceeds the capabilities of most nontechnical users.

As a matter of context, 3D reconstruction technology should be distinguished from 3D filming techniques. 3D filming techniques do not perform any 3D reconstruction. 3D filming techniques instead capture a scene from two different points of view so that those scenes may later be shown to a viewer via a 3D display. The 3D geometry of the captured scene in the context of 3D filming is never calculated by a computer; the raw stereo image is simply passed on to the viewer for perception.

SUMMARY OF THE INVENTION

Embodiments of the present invention provide for the capture and alignment of multiple 3D scenes. In one exemplary embodiment, the capture of 3D scenes is achieved by any one or more of a variety of 3D capture devices. Data from a 3D capture device produces 3D scene data, including information about the position and appearance of objects in physical space. The data may also include information regarding the position and/or orientation of the capture device. A set of one or more features that collectively include one or both of geometry and appearance information from points and/or regions in the 3D scenes is then computed.

As 3D capture device data captured in different locations is received, different perspectives of 3D scenes are obtained. The 3D scene, feature data, and other sensor data (if available) can then be used as inputs to an algorithm that determines potential alignments between different 3D scenes via coordinate transformations. These potential alignments are evaluated for their quality and, once an alignment of sufficiently high relative or absolute quality is achieved, the 3D scenes may be aligned together. Through repeated alignments of new 3D scenes (as well as potential improvements to alignments of existing 3D scenes), a global alignment of all or most of the input 3D scenes into a single coordinate frame may be achieved.

Error is an inevitable part of the capture process. For example, a user moving a 3D capture device may not capture all parts of an object or scene. "Holes" are inclusive of areas not seen by the 3D capture device at any point in the capture process. Holes are likewise inclusive of areas present in captured scene data, but that are of insufficient resolution or quality for a particular purpose. A process for identifying and filling holes may be implemented in certain embodiments of the present invention to resolve this un-captured or low quality data problem.

Such an exemplary process may include identifying holes, visually presenting the area around a particular hole or holes to a user, allowing the user to capture the 3D scene containing areas within the hole or holes as well as part of the surrounding area using the 3D capture device, and aligning the new 3D captured scene to the existing 3D scenes and/or 3D composite scenes.

In some embodiments, the method may further include verifying whether the hole has been filled, providing feedback to the user indicating whether the hole has been filled, and then repeating the hole-filling process for the same or other holes as is necessary. The method may, in some instances, include the use of a system for determining whether the hole may be filled algorithmically using assumptions based on the surrounding area.

DETAILED DESCRIPTION

Figure 1:
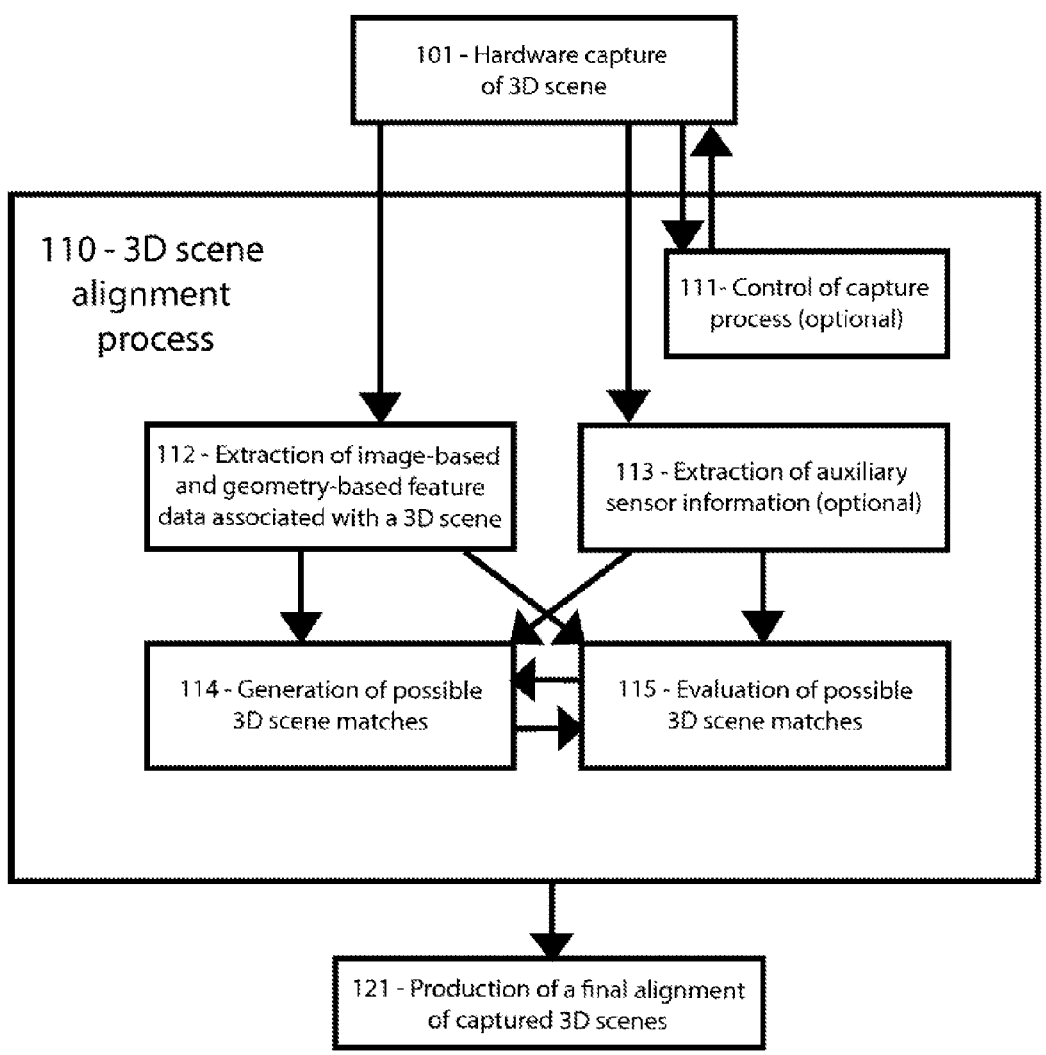
FIG. 1 illustrates an exemplary method for 3D scene alignment.

FIG. 1 illustrates an exemplary method for 3D scene alignment. Numerous capture devices (101) are capable of capturing 3D information. Examples of 3D capture devices include LIDARs, hand-held laser line scanners, structured light projectors paired with cameras such as the Microsoft® Kinect, other structured light systems, stereo cameras with software for depth derivation, stereo cameras paired with pattern projection systems as well as software for depth derivation, time-of-flight cameras, video cameras capable of structure-from-motion calculations, and lightfield cameras. Multiple capture devices may be combined or a capture device may be paired with a color camera to provide color detail for the captured information.

For the purpose of the present disclosure, a 3D scene may be interpreted as including at least a collection of visual appearance and geometric information about the physical world. That 3D scene information may be simultaneously captured or captured over time by a 3D capture device.

The information in a 3D scene can take many forms. For example, the information may include a point cloud, which is a series of points with XYZ spatial coordinates as well as a brightness intensity value or color values (eg RGB or HSV). The XYZ spatial coordinates may be presented in absolute coordinates relative to a chosen origin point and axes, camera-relative coordinates, or another coordinate frame. Points in a point cloud may, in one example, be organized into a two-dimensional (2D) grid corresponding to the rectangular layout of pixels on the capture device. Point clouds may, in some instances, have incomplete information. For example, some points may lack XYZ information and/or image intensity or color information.

The information may also take the form of a pair of images with one image containing visual appearance data and the other image from the pair of images containing geometrical data. The visual data image may include a 2-dimensional RGB image, a 2-dimensional intensity image, or some other form of image data. The geometrical data image may include a depth map in which each pixel contains a value denoting the distance from the 3D capture device to the location seen in that pixel. Geometrical data may also include a disparity map or other representation from which distance information may be derived. The two images may be aligned with one another so that a given pixel in one image is known to correspond with a given pixel in the other image. The information may also take the form of a single image in which each pixel contains information about both distance and visual appearance. Other possible representations of 3D scene information are envisioned to be within the scope of the present invention as the aforementioned configurations are exemplary and not intended to be exhaustive or limiting.

The 3D scene information is processed by a 3D scene alignment process (110) that takes multiple 3D scenes captured from multiple points of view and produces an alignment of some or all of them into a common coordinate frame. A 3D capture device may move over time, creating 3D scenes from multiple points of view at step 110. This sensor motion may be accomplished by the sensor being attached to a moving robot or vehicle, or by the manual actions of a human user. Alternately, there may be multiple sensors in fixed but different positions capturing at the same or different times.

Parameters of the 3D capture device (101) may be controlled at step 111 by aspects of the 3D scene capture or alignment process (110). The control parameters may vary widely depending on sensor type. Examples of control parameters include but are not limited to camera exposure parameters and white balance.

The 3D scene information from the 3D capture device (101) may be accompanied by other information at step 113, which may be generated by the 3D capture device (101) or some other device operating in conjunction with the same. Other information introduced at step 113 may include orientation and/or position information of the capture device. This information may be determined by an accelerometer (e.g. a 3-axis accelerometer), Inertial Measurement Unit (IMU), gyroscope, trilateration system (e.g., GPS or a local arrangement of signal emitters), visual odometry calculation, physical odometry measurement, augmented reality markers, or any variety of a combination of the aforementioned or other technologies. Physical measurements of absolute scale may also be taken. The time of each 3D scene capture may also be determined. Rough estimation of camera movement may be computed using methods such as optical flow or 2D or 3D feature tracking. This information may be used to provide additional clues about alignment when determining automatic alignment of 3D scenes (114, 115).

Once image information is acquired, further processing may be performed at step 112 to compute derivative visual and/or geometrical information of the 3D scene. This derivative information may take many forms. Examples of this information include extra values or vectors of values (e.g., a feature vector) at each point or at a reduced set of points, point classifications, identification of points as unusual features, addition of other locations, surfaces, or volumetric regions as having a particular significance, as well as other forms. Some examples of derivative features include local surface normal vectors, local min/max curvature values, shape feature histograms, distance from nearest depth boundary, range from camera, local intensity or color gradient, distance from nearest color boundary, SIFT or SURF features, local color feature histograms, extractions of planes, cylindrical areas, spherical areas, or other geometric primitives, object recognition algorithms, text recognition algorithms, or facial recognition algorithms. Various types of features may be combined together for added descriptive power.

Potential alignments for multiple 3D scenes are generated at step 114 and evaluated at step 115 in order to find the most plausible relative alignment for these scenes. The overall goal is to merge the information from the multiple 3D scenes into a single space (121) that corresponds to the positions of their data relative to one another in the physical world. This process includes finding and evaluating likely candidate alignments based on directly sensed (e.g., color and xyz feature information) and/or derivative information from the 3D scenes. The aforementioned steps may take place consecutively or concurrently.

In one embodiment, this process may be akin to looking for points or regions with particular characteristics that occur in both of a pair of 3D scenes. By identifying these points or regions, a candidate coordinate transformation may be established allowing for the mapping of one 3D scene to the other so that the scenes overlap and matching points or areas with similar characteristics would be in similar positions. In one particular example, the implementation of this process would include points in a 3D scene being stored in a feature tree based on derived feature information about those points. The result allows for rapid lookup of points or regions that have a set of features similar to a given set of feature values or, alternatively, to points that have a set of features similar to a feature or features of a given point or region.

Potential matching points between two scenes (step 114) may be found by picking a point or region from the feature tree of one 3D scene and then looking for neighbors based on the features of this point or region in the feature tree of the other scene. The selection of three or more points or regions from the first 3D scene plus their corresponding neighbors in the other 3D scene produces a candidate transformation from one 3D scene to the other. The candidate transformation may then be evaluated by a scoring function.

Various optimizations in point or region selection and match evaluation are possible. For example, points or region with unusual features relative to the rest of the 3D scene (or both 3D scenes being aligned) may be preferentially chosen as they are likely to have fewer incorrect neighbor matches in the other 3D scene. Potential sets of corresponding points or regions may be rejected because their geometric relationships may not be preserved (e.g., the distance between two points or regions in one scene may be significantly different from the distance between the two corresponding neighbor points or regions in the other scene). Transformations that are not consistent with gathered accelerometer data for the two 3D scenes may be rejected.

Candidate 3D scene alignments are evaluated at step 115. Evaluations occur by comparing points or regions from one 3D scene, transformed by a candidate 3D spatial transformation between scenes, to points or regions from the other 3D scene. In one embodiment, spatially transformed points and/or regions from one 3D scene are given a score based on the positions and features of the nearest neighbor (in terms of position) points or regions in the other scene. Scoring may be computed from a variety of criteria and may occur at different points in the capture and alignment process. Scoring includes but is not limited to similarity of position, luminous intensity, color, local normal vectors, local curvature values, local intensity or color gradient magnitude and/or direction, distance from nearest color boundary, SIFT or SURF features, local color feature histograms, and/or other features.

Scoring of points or regions may be influenced by whether the position of the point is plausible from the point of view of the 3D capture device of the other scene. For example, if the transformed position of a first point or region from a first 3D scene places it in a position in the second 3D scene that is known to be empty space (e.g., because the first point/region is substantially closer to the second 3D capture device than the point/region from the second 3D scene detected along the ray from the second 3D capture device to the first point/region) then this point is likely in the wrong position and the match score may be penalized. If the transformed position of a first point/region from a first 3D scene places it in an occluded region of a second 3D scene, however, then the quality of the point/region match may not be able to be determined and the point/region may not be scored. This might occur in the case of the first point/region being substantially farther from the second 3D capture device than the point/region from the second 3D scene detected along the ray from the second 3D capture device to the first point/region.

Agreement or disagreement over known-empty space—the degree and nature of the overlap between regions of known empty space from the first 3D scene and the second 3D scene—may also influence the score. The overall score may also be influenced by whether regions of higher-level extracted information from one scene is present in the other scene at a similar position and with similar parameters. Examples of such information include extractions of planes, cylindrical areas, spherical areas, or other geometric primitives, object recognition algorithms, text recognition algorithms, and facial recognition algorithms.

Point or region scores, or components of these scores may be weighted, adjusted, or scaled (e.g., by adding a forgiveness factor) based on various aspects of the data or feature data. For example, in some 3D capture devices, points or regions near depth boundaries and/or at high ranges often have unreliable range data, so points/regions near boundaries and/or at high ranges may receive less weight in an overall score and/or in a component of the score. In another example, areas recognized to be faces may be given greater weight because faces may be more important to get properly aligned than background.

A wide variety of methods for computing overall score exist. For example, points/regions may be subsampled, or only some points/regions may be evaluated. To compute an overall score for a point or region, components of the score based on different features or criteria may be added, multiplied, or computed entirely via another methodology. The overall score for an alignment may be a sum of point and/or region scores, a weighted sum of point and/or region scores, or another method.

Potential alignments may not be completely scored as they may be rejected early in the scoring process or penalized or rejected based on other criteria such as data from auxiliary sensors (113) that imply that a particular transformation is very unlikely. For example, a particular transformation may be penalized or rejected because it is unlikely that a single 3D capture device would have moved by the amount required by the transformation in the time between the two captures of the 3D scenes. High level scene features such as distribution of normal vectors, curvature, color, or other data may be used to assess the likelihood that a pair of scenes has any overlap. The correct transformation for an alignment of two 3D scenes may be determined by a particular score threshold, where a score better than the threshold is determined to be indicative of a correct or close to correct transformation. A fine point cloud alignment technique such as Iterative Closest Points may be used to create further improvements in a close-to-correct transformation.

When multiple 3D scenes are aligned together via a coordinate transformation or other spatial transformation, they may comprise a single collection of merged point and/or region data called a 3D composite scene. These 3D composite scenes can be treated similarly to 3D scenes by the alignment generation (114) and scoring (115) algorithms as well as other parts of the system (110). A 3D composite scene may therefore be aligned with a 3D scene, and two 3D composite scenes may be aligned to one another using techniques similar to the ones described above for the alignment of two 3D scenes. Algorithms may vary. For example, if the scoring algorithm penalizes points that are mapped to known areas of empty space in the other 3D scene, the determination of empty space in a 3D composite scene may have to take into account multiple 3D capture device positions or use a volumetric storage structure such as an octree to delineate empty space.

Numerous processes made be implemented to merge data from multiple 3D scenes into a 3D composite scene. In one process, all the data from each 3D scene is kept and merged together. In another process, sections from each scene may be stitched together based on particular criteria. These criteria may include minimization of a particular boundary error function. In another process, points or regions are sampled, averaged, or otherwise reduced and/or combined based on data in local spatial neighborhoods. Said points or regions are then sorted into voxel grids of a particular or variable resolution, or chosen via some other method.

During any reduction and/or combination process, data may be weighted from different scenes based on the types of factors described for scoring such as expected sensor error, motion blur, or allowing more position error along the axis from the sensor. For some 3D capture devices, data at greater range from the capture device is less accurate. As a result, such data may carry less weight or be more likely to be deleted when creating a 3D composite scene.

The positions of points or regions from different 3D scenes may be altered to perform a non-rigid alignment that maximizes visual quality. For example, if an edge or key point is located in slightly different places in different 3D scenes, the positions of a spatially localized cluster of points or regions in the different 3D scenes may be moved to improve visual alignment. Determinations of known-empty space may be used to guide the process of merging the multiple 3D scenes. Different processes may be used on different parts of the 3D composite scene. For example, a special algorithm may be used on areas of the 3D composite scene recognized as part of a human face.

Some 3D capture devices have low-spatial-frequency noise or distortions in their distance calculations that make precise rigid alignment of multiple 3D scenes impossible. It is possible, however, to compensate for these distortions via an error correction process. Such compensation may occur either during the rigid alignment process or afterwards.

Multiple methods of removing these distortions may be used. In one embodiment, points or regions from a given 3D scene are allowed to vary in distance from the sensor, and a cost function is imposed. The cost function may be based directly on the amount of distance error correction applied, the difference in amount of error correction applied at a particular location relative to neighboring locations, the distance from the sensor, or on any combination of these and/or other factors. For example, the cost function for error correction at a point may be calculated as:

(CONSTANT0+CONSTANT1*(distance from sensor^2))*(ABS(point error correction)*CONSTANT2+(sum over all adjacent points of ((point error correction−adjacent point error correction)^2))*CONSTANT3)

In another embodiment, movement of points or regions in any direction is allowed, and the cost function may impose different penalties for movement along the distance axis of the 3D capture device relative to other directions.

Possible error corrections may be generated via a variety of methods. In one example, nearby similar key points or edges from different 3D scenes post-alignment may be noted; error correction amounts to bring those key points or edges, and potentially neighboring areas, into alignment may be applied. In another example, points or regions of similar appearance from different scenes that lie along intersecting rays from their respective 3D capture devices' locations may be moved toward the intersection of those rays. In a further example, points or regions that are close to coplanar may be flattened so that they are coplanar. In yet another example, successive alignment refinement algorithms such as Iterative Closest Points (ICP) may be applied to patches of multiple 3D scenes, and the movements are applied to generate error correction functions.

The viability of potential error corrections may be evaluated by comparing a calculated cost function to an improvement in alignment score. Error corrections may be generated iteratively, allowing successive improvement in alignments. If the distortions are somewhat consistent over time, it is also possible to partially remove them prior to the alignment process.

A given material in a 3D scene may not have the same visual appearance (brightness and color) from every angle. For example, the appearance of a material may be determined by a combination of diffuse reflection, partial specular reflection (e.g., a glossy surface), complete specular reflection (e.g., a mirror), partially diffused specular reflection (e.g., brushed aluminum), translucency, transparency, or other reasons. The generalized appearance of an opaque material is often defined via a Bidirectional Reflectance Distribution Function, or BRDF.

As multiple 3D scenes are aligned, information about material properties may be gathered by examining the appearance of points or regions in a particular spatial area that were captured from different angles. At the simplest level, the variation or lack thereof of a material's appearance at different angles may be noted in the final merged 3D composite scene. The information, however, can be applied in many useful ways. For example, points or regions containing a material for which the appearance varies with angle may have their scores computed or weighted differently during future evaluation of 3D scene matches so that a mismatch in brightness or color is less penalized.

During the process of merging multiple 3D scenes into a 3D composite scene, the selection of point or region brightness in a given location may be computed by taking the minimum brightness across all the 3D scenes. There are, however, other ways of identifying the presence of varying material appearance. For example, locations for which there is a high spatial frequency of change in brightness or color when captured from one direction but not from another direction likely to have either some specular reflection, partially diffused specular reflection, or partial transparency.

Some properties of the material may be derived. Since the normal vector of the surface at a given location is usually approximately known, a ray-tracing algorithm could be used to determine the source position of the specularly reflected component of a material's appearance. In the case that a material's brightness is determined by the sum of a diffuse component and a specular component, having data on two or more points of view on the material may allow the approximate derivation of the diffuse and specular reflectances of the material. The derivation may take the form of a method for finding a least-squares solution to an over-determined system of equations in which the diffuse and specular components of reflectance at a point on a surface are unknown but the brightnesses observed at that point from various points of view as well as the brightnesses of the locations that would contribute to specular reflection from those various points of view are known. These derived properties may be stored in the 3D scene or 3D composite scenes, and may be used to interpolate or derive expected brightnesses from other angles, which may aid in more accurate scoring during 3D scene alignments.

In the case of the alignment of more than two 3D scenes, there are multiple methods of aligning all of the scenes relative to one another. One possible technique is to perform a pairwise chain alignment in which 3D scenes in a series of pairs are aligned according to capture order. The theory in such an alignment is that 3D scenes captured at sequentially adjacent points in time are likely to overlap. A pairwise alignment of each adjacent 3D scene together produces a chain of alignments that links all the 3D scenes into a single common coordinate space. These scenes may be paired independently, or a 3D composite scene may be gradually built up by adding each subsequent 3D scene in the chain.

The pairwise chain alignment technique has the deficiency that it may fail if any adjacent pair of 3D scenes does not sufficiently overlap. One solution to the problem of broken chains is to allow for interactive feedback with the capture process. In this case, the 3D scene alignment process (110) performs a rapid initial alignment of each sequential pair of 3D scenes as they are captured. If no adequate alignment is found, the user (or robotic vehicle) is prompted to move the 3D capture device back to a position that overlaps with the previous captured 3D scene. The prompting may be video, audio, or by some other impetus. For example, one sound may be emitted if the initial alignment succeeds while another sound is emitted if the initial alignment fails. This process repeats until a good match for the previous captured 3D scene is found. Another possible solution to the broken chain problem is to align each connected part of the chain into a 3D composite of 3D scenes and then separately try to align the 3D composite scenes with one another. In some scenarios this will produce successful alignments of the overall system.

Many alternatives to the pairwise chain alignment technique exist. For example, pairs of 3D scenes from a collection of captured 3D scenes may be matched with one another until a good match is found. The choice of what pairs of scenes to attempt to match could be combinatorially exhaustive (i.e., matching all 3D scenes with all other 3D scenes), randomly chosen, or chosen based on heuristics derived from scene properties. These properties might include the presence of certain features in a significant number of points, similarity of histograms calculated based on scene features, presence of matching keypoints, or other properties. Once a match is found, the pair of highly matched scenes may be merged into a 3D composite scene and then returned to the collection of captured 3D scenes. This process may be repeated until all 3D scenes have been merged into a single 3D composite scene or until no further good matches can be made.

The aligned scenes comprising a 3D composite scene may undergo further fine alignment in order to maximize alignment quality. Network optimization methods such as TORO help spread out errors across a graph of aligned scenes, and algorithms such as Iterative Closest Points can be used to improve the fine alignment between a scene and its neighbors.

The final alignment of captured 3D scenes may be represented by a variety of formats. The alignment may include a raw point cloud of the merged points from the original 3D scenes, a point cloud with a reduced number of points based on enforcing a maximum volumetric point density, a triangular mesh with vertex colors, a triangular mesh with texture map, a collection of surfels, or another representation all together. Other high level information such as the identity of source 3D scenes or identification of regions and extracted objects may likewise be present.

Potential uses of the aforementioned technology include, but are not limited to simplifying the process of digitizing real-world scenes and objects for use in computer-animated games, movies, virtual worlds, sales, or other uses; creating accurate 3D records of building interiors for architecture/remodeling, interior decoration, insurance documentation, telepresence, sales, virtual tourism, or other uses; and scanning of a person's body using either using one 3D capture device over time or multiple 3D capture devices from different angles in order to acquire detailed size metrics or volume.

Applications for body scanning are numerous. Examples include but are not limited to sizing for clothes, creation of computer-generated characters mimicking the scanned person, tracking fitness or weight loss, computing body volume, creating unique casts, and preparation for cosmetic surgery.

Determination of the volume or surface area of scanned objects may also be implemented using the aforementioned technology. In agricultural applications, as but one example, the surface area of the leaves on a plant or the body volume of livestock can be easily computed. As another example, the square footage of a house may be calculated. Similarly, the volume of paint required to paint an object may be calculated.

Augmented reality applications are likewise envisioned. For example, by scanning a 3D environment, it becomes easy to insert virtual objects in that 3D environment. This merged real-virtual scene could be viewed on a computer display with viewpoint controlled via a user interface. Alternatively, the scene could be present on a spatially aware display such that as the display is moved around in the 3D environment, the virtual objects can be inserted.

Human error is an inevitable part of the capture process. For example, a human user moving a 3D capture device may not capture all parts of an object or scene. Holes, including areas not seen by the 3D capture device at any point in the capture process, or areas seen at insufficient resolution or quality, may be present. Thus, a process for identifying and filling holes may be necessary.

Figure 2:
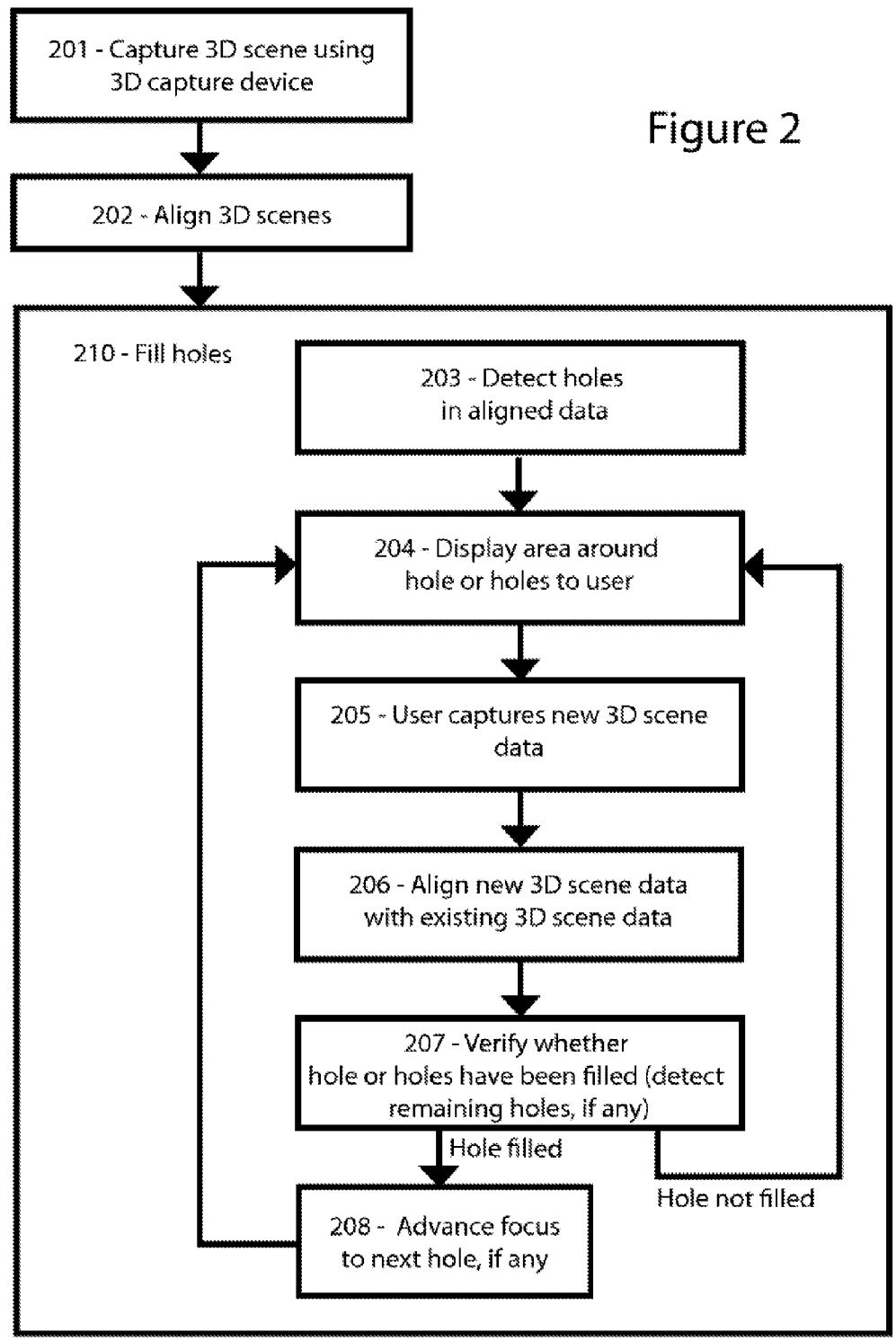
FIG. 2 illustrates an exemplary method for filling holes in aligned 3D scene data.

FIG. 2 illustrates an exemplary method for filling holes in aligned 3D scene data. Three-dimensional scene data is first captured (201) and aligned (202). The hole-filling process (210) includes detecting holes in aligned 3D scene data (203), visually presenting the area around a particular hole or holes to a user (204), allowing the user (or some other entity, object, or apparatus) to capture the 3D scene containing areas within the hole or holes as well as part of the surrounding area using the 3D capture device (205), aligning the new 3D captured scene to the existing 3D scenes and/or 3D composite scenes (206), verifying if the hole has been filled (207), providing feedback to the user indicating whether the hole has been filled, and then repeating the hole-filling process as necessary for other holes (208).

The presence of holes may be detected (203) using a variety of methods. Holes may be found by first looking for boundary points or regions. In one embodiment, boundary points or regions may be identified by projecting all nearby points/regions to a candidate point/region onto the plane defined by the candidate point/region's normal vector, and looking for looking for empty quadrants, areas above a certain size, or ranges of angles in polar coordinates (with the main point at the center).

Potential boundary points may, in a further embodiment, be identified directly in a 2D grid of depth data produced by the 3D capture device. For example, identification may occur by looking at whether a point has adjacent neighbors with missing depth data or with substantially different depth values from the point that would indicate an occlusion boundary. As multiple 3D scenes are captured and aligned, boundary points in one 3D scene that are surrounded by non-boundary points in at least one other 3D scene are unmarked such that they are no longer marked as boundary points.

Once boundary points are identified, holes may be determined by various techniques. In one embodiment, nearby boundary points are linked, and paths in the graph of connected boundary points are determined. Loops of connected boundary points may be determined to be holes. Specific parameters, such as the length of the loop, may be used to determine what holes merit attention. Holes may also be found by looking for regions of known-empty space that are bordered by regions that were not captured during the capture process. A shared boundary surface between a known empty space region and a region not captured by any of the 3D scenes may be designated as a hole.

Once holes are identified, they may be visually presented to a user (204) for evaluation and/or filling. If the position and size of a hole is known, and the presence of nearby empty space is known, the 3D scenes and/or 3D composite scenes in the area may be rendered from the perspective of a nearby location in known empty space at a distance and angle such that the captured 3D scene data immediately surrounding the hole is visible. Methods of computing such a location and orientation vary.

The maximal size dimension of the hole combined with the field of view of the camera may be used to compute an appropriate minimal distance for the camera. Possible camera positions may be checked for a lack of occlusions of the hole area. These positions may be used to guide the placement of a virtual camera in order to render the view of the area surrounding the hole for presentation to the user.

Holes may be highlighted. For example, the points along the boundary of the hole may be marked in a particular color. Alternatively, a surface covering the hole may be filled in with a particular color. If multiple holes are nearby, the system may opt to create a rendering showing all the nearby holes and their surrounding captured 3D scene data.

Once a visual rendering of the area around the hole or holes is displayed to the user, the user may have various options on how to proceed. One option is to provide new 3D scene data to fill the hole (205). Another option is to ignore the hole. A third option is to use an automatic hole-filling algorithm and/or texture synthesis algorithm that can guess at the shape and visual appearance of the surface in the hole region.

For example, if the hole is surrounded by a flat or smoothly curved surface, the missing area in the hole may be presumed to be an extension of the surface, and the likely texture of this missing area may be determined by using a texture synthesis algorithm with the surrounding area as texture input. Still another option is to mark the hole as an un-scannable object such as a very shiny ball, or as an object too distant or too close to be scanned by the 3D capture device. The user may indicate their preference by selecting a menu option or via other means, such as by pointing the 3D capture device at the hole to be filled.

Options may also be chosen automatically based on pre-defined or user-defined rules. For example, holes that are below a certain size or holes for which the surrounding surface is flat or smoothly variable and the texture of the surrounding surface is highly predictable may be filled automatically while large holes or holes of more complex shape may be displayed to a user (204) for manual filling. The decision of whether to automatically fill a given hole may also take place after step 203. In one embodiment, all holes are considered for automatic filling prior to being displayed to a user, and holes for which the automatic hole fill algorithm is likely to produce the correct result (e.g., a calculated confidence value for the correctness of an automatic fill is above a certain threshold) are filled automatically. Holes that do not meet the criteria for automatic filling are then displayed to the user (204) for manual filling.

In some cases it may be possible to recover the likely position of an un-scannable object via other means. In the case of an object that is too shiny or otherwise undetectable by the sensor, the object's position and likely shape may be derived by various methods such as the intersection of the various 3D scenes' frustums defined by the outline of the undetected area in each scene. In the case of a distant object, the position and shape of the object may be derived by various techniques such as stereo 3D reconstruction and may use the approximate derived 3D capture device positions of the various 3D scenes to aid in the reconstruction process. In some cases these techniques may be applied automatically when appropriate instead of prompting the user for action.

In the case that the user chooses to fill the hole or holes (205), the user typically moves and positions the 3D capture device to capture an area such that some or all of the missing surface "inside" the hole is visible to the 3D capture device, as well as some of the area around the hole. The software is then able to use an algorithm for evaluating 3D scene matches in order to attempt to match the newly captured 3D scene to some or all of the existing 3D scene data surrounding the hole (206). If the match is successful, the region may be re-evaluated to determine whether part or all of the hole is still present (207). The user may be alerted via visual and/or audio means to whether the match was successful and to whether the hole has been partially or completely filled. If the hole remains unfilled, the user may be prompted to make a follow-up decision about what to do about any remaining hole or holes in the area (e.g., whether to continue to try to capture the area inside the hole or to choose another option), or the remaining hole or holes may be filled automatically using the techniques described herein.

The hole-filling process may happen during the capture process or at the end. In the case that the hole-filling process happens during the capture process, the set of 3D scenes captured so far may be incrementally or continuously checked for holes, and the user may be prompted to fill holes. This prompting may begin to occur when the 3D scenes being captured are no longer within a particular distance of the hole, implying that the user has moved away from the hole area. Alternately, holes may be immediately and/or continuously highlighted in the 3D reconstruction of 3D scenes captured so far. In this case, the display of the area around a hole or holes (204) may not focus on a specific hole or holes, and alignment (206) may not be targeted at the area surrounding a particular hole. The process of hole-filling may end when all holes are filled or otherwise evaluated for action, or may end earlier at user option.

The process of hole-filling may also be applied as a way of addressing areas of the 3D captured data that are of insufficient density or quality. For example, areas of captured data may be too low density, too noisy or inaccurate in terms of position or color, too bright, too dim, or otherwise too low quality. These areas may be identified by any one of a variety of processes. Once identified, these areas may be marked directly as "holes" that need filling with better-quality data, or these areas may be removed prior to running a hole-detection process.

In some cases, high-quality data and low-quality data may be mixed together, and an additional process may be needed to determine whether the existing high-quality data is sufficient or whether new captured 3D scenes are necessary to fill in the low-quality areas. The process and user interface for filling in low-quality areas with new high-quality scans may then proceed along similar lines to the hole-filling algorithm described above, with the additional step of determining whether the new 3D scene data has filled the low-quality area with data of sufficiently high quality.

The 3D capture device may be moved on a robotic arm or vehicle, with a software system determining the order of capture instead of a user. In this case, a hole-filling system akin to the ones described herein and shown in FIG. 2 may be used, with the exception that step 204 may be changed to instead be an algorithm to determine the ideal location for the 3D capture device to fill the hole. This problem is similar to the problem of generating a point of view to render a display of the hole; the placement of the 3D capture device to capture the hole may be similar to the location and point of view that would be used to render a view of the hole.

The processing steps described in the context of FIGS. 1 and 2, as well as in the rest of the description, may take place in a variety of locations and in various orders. Any given processing step may be on the 3D capture device, on a connected device or devices in the same enclosure, on a connected device or devices in a separate enclosure, on a nearby device or devices with sharing of information via wireless communication, or on a remote device or devices with sharing of information via wireless communication. Computation tasks may be distributed to increase speed, or may run on specialized hardware.

Figure 3:
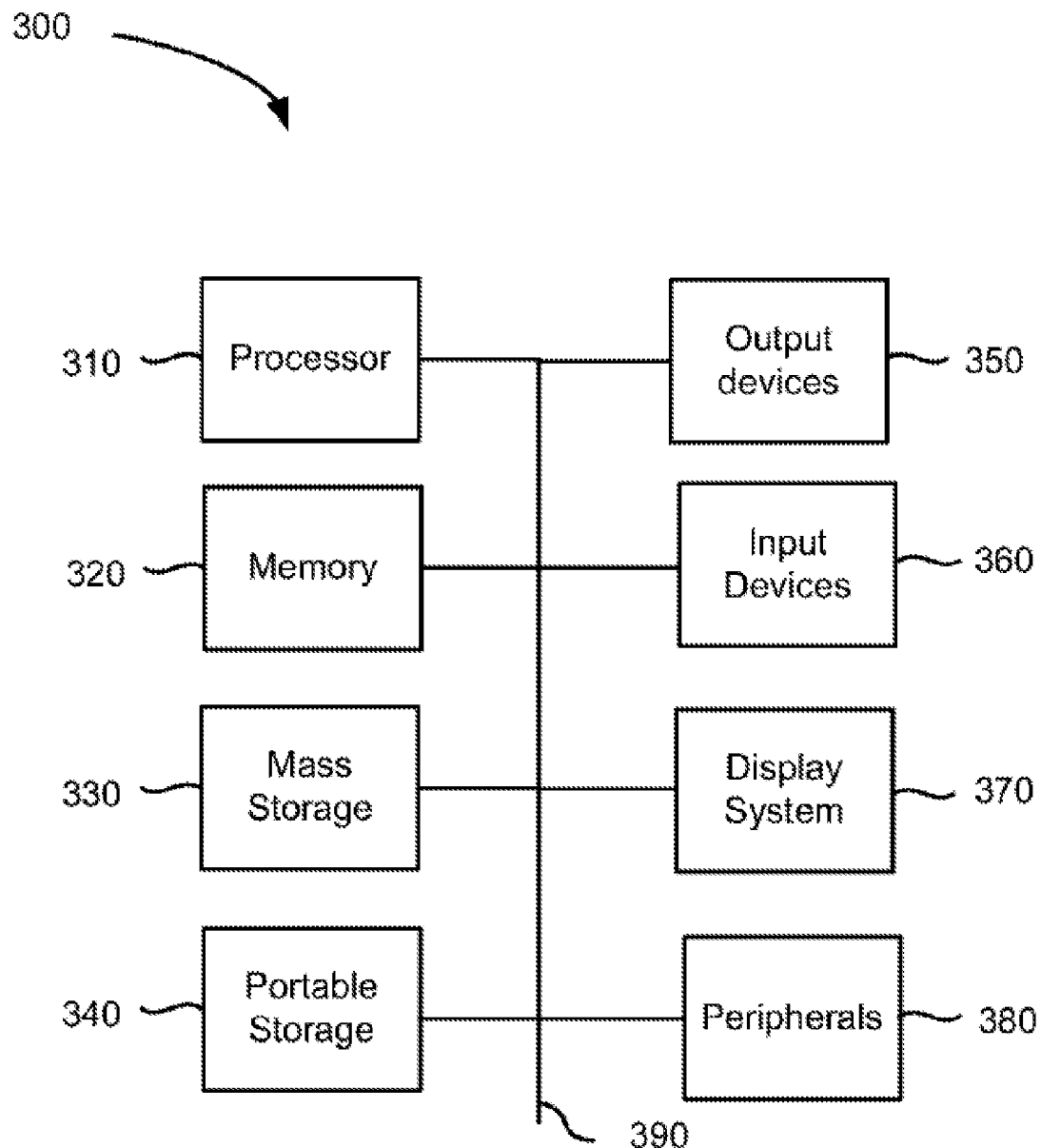
FIG. 3 is a block diagram of an exemplary computing device.

FIG. 3 illustrates an exemplary computing device 300 that may be used to implement certain embodiments of the present technology. System 300, or elements thereof, may be implemented in the contexts of the likes of a 3D capture device. The computing system 300 of FIG. 3 includes one or more processors 310 and memory 320. Main memory 320 stores, in part, instructions and data for execution by processor 310. Main memory 320 can store the executable code when in operation. The system 300 of FIG. 3 further includes a mass storage device 330, portable storage medium drive(s) 340, output devices 350, user input devices 360, a graphics display 370, and peripheral devices 380.

The components shown in FIG. 3 are depicted as being connected via a single bus 390. However, the components may be connected through one or more data transport means. For example, processor unit 310 and main memory 320 may be connected via a local microprocessor bus, and the mass storage device 330, peripheral device(s) 380, portable storage device 340, and display system 370 may be connected via one or more input/output (I/O) buses.

Mass storage device 330, which may be implemented with a magnetic disk drive or an optical disk drive, is a non-volatile storage device for storing data and instructions for use by processor unit 310. Mass storage device 330 can store the system software for implementing embodiments of the present invention for purposes of loading that software into main memory 320.

Portable storage device 340 operates in conjunction with a portable non-volatile storage medium, such as a USB drive, compact disk or Digital video disc, to input and output data and code to and from the computer system 300 of FIG. 3. The system software for implementing embodiments of the present invention may be stored on such a portable medium and input to the computer system 300 via the portable storage device 340.

Input devices 360 provide a portion of a user interface. Input devices 360 may include an alpha-numeric keypad, such as a keyboard, for inputting alpha-numeric and other information, a pointing device, such as a mouse, a trackball, stylus, or cursor direction keys, a multi-touch device, or a gesture control device. Additionally, the system 300 as shown in FIG. 3 includes output devices 350. Examples of suitable output devices include speakers, network interfaces, and monitors.

Display system 370 may include a liquid crystal display (LCD) or other suitable display device. Display system 370 receives textual and graphical information, and processes the information for output to the display device.

Peripherals 380 may include any type of computer support device to add additional functionality to the computer system. For example, peripheral device(s) 380 may include a wireless communication device or 3D capture device.

The components contained in the computer system 300 of FIG. 3 are those typically found in computer systems that may be suitable for use with embodiments of the present invention and are intended to represent a broad category of such computer components that are otherwise well known in the art. Thus, the computer system 300 of FIG. 3 can be a personal computer, hand held computing device, mobile computing device, smart phone, dedicated workstation, server, minicomputer, mainframe computer, or any other computing device. The computer can also include different bus configurations, networked platforms, multi-processor platforms, cloud storage by way of a network connection and the like. Various operating systems can be used including Unix, Linux, Windows, Macintosh OS, and iOs.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A method comprising:
   obtaining, by a system comprising a processor, two or more sets of three dimensional data of a plurality of sets of three dimensional data, wherein the plurality of sets of three dimensional data comprise points in a three dimensional coordinate space, wherein the points are associated with three dimensional features, and wherein the two or more sets are associated with different capture positions relative to the three dimensional coordinate space;
   generating, by the system, a plurality of alignment schemes between two or more of the sets of three dimensional data based on the three dimensional data using a spatial transformation;
   evaluating, by the system, the plurality of alignment schemes based on quality of alignment of the two or more sets of three dimensional data as aligned with respect to each of the plurality of alignment schemes; and
   selecting, by the system, an alignment scheme of the plurality of alignment schemes associated with a higher quality of alignment with respect to other alignment schemes of the plurality of alignment schemes.

2. The method of claim 1, further comprising:
   generating, by the system, a merged set of three dimensional data based on the alignment scheme using the two or more sets of three dimensional data, wherein the merged set of three dimensional data comprises a merged set of three dimensional features based on combined three dimensional features of the two or more sets of three dimensional data.

3. The method of claim 2, further comprising:
   generating, by the system, new alignment schemes between the merged set of three dimensional data and one or more other sets of three dimensional data of the plurality of sets of three dimensional data based at least on the geometric information for the merged set of three dimensional features.

4. The method of claim 2, further comprising:
   evaluating, by the system, the new alignment schemes based on quality of alignment of the merged set of three dimensional data and the one or more other sets of three dimensional data as aligned with respect to each of the new alignment schemes;

selecting, by the system, a new alignment scheme of the new alignment schemes associated with a higher quality of alignment with respect to other new alignment schemes of the new alignment schemes; and generating, by the system, a new merged set of three dimensional data based on the new alignment scheme using the merged set of three dimensional data and the one or more other sets of three dimensional data.

5. The method of claim 1, wherein the three dimensional data further comprises appearance information for the three dimensional features, and wherein the evaluating the plurality of alignment schemes comprises comparing geometric information and appearance information for three dimensional features included in the two or more sets of three dimensional data as aligned with respect to each of the plurality of alignment schemes.

6. The method of claim 5, wherein the evaluating the plurality of alignment schemes further comprises:

determining quality of alignment scores for the plurality of alignment schemes, respectively, based on the comparing, and wherein the selecting the alignment scheme comprises selecting the alignment scheme based in part on a quality of alignment score associated therewith.

7. The method of claim 6, wherein the determining the quality of alignment scores comprises determining the quality of alignment scores based on consideration of existence of known empty space in the two or more of the plurality of three-dimensional scenes.

8. The method of claim 6, wherein the determining the quality of alignment scores comprises determining the quality of alignment scores based on types of the features included in the two or more of the plurality of three dimensional scenes.

9. The method of claim 6, wherein the selecting the alignment scheme comprises selecting the alignment scheme based on association of the alignment scheme with a quality of alignment score above a threshold value.

10. The method of claim 6, wherein the determining the quality of alignment scores comprises determining the quality of alignment scores based on similarities in geometric location and physical appearance of the features respectively included in the two or more sets of three dimensional data as aligned with respect to each of the plurality of alignment schemes.

11. The method of claim 1, further comprising, applying a local optimization process to one or more of the plurality of alignment schemes that improves the quality of the alignment of the two or more sets of three dimensional data.

12. The method of claim 1, further comprising, applying a non-rigid alignment process following the generating the plurality of alignment schemes.

13. The method of claim 1, further comprising:

receiving, by the system, respective orientation information of a device that captured the plurality of sets of three dimensional data; and generating, by the system, the plurality of alignment schemes based on the orientation information.

14. The method of claim 1, further comprising:

receiving, by the system, respective position information of a device that captured the plurality of sets of three dimensional data; and generating, by the system, the plurality of alignment schemes based on the position information.

15. A system, comprising:

a memory to store executable instructions; and a processor, coupled to the memory, that facilitates execution of the executable instructions to perform operations, comprising:

receiving two or more sets of three dimensional data, of a plurality of sets of three dimensional data, wherein the plurality of sets of three dimensional data comprise points in a three dimensional coordinate space, wherein the points are associated with three dimensional features, and wherein the two or more sets are associated with different capture positions relative to the three dimensional coordinate space;

generating a plurality of alignment schemes between two or more of the sets of three dimensional data based on the three dimensional data using a spatial transformation;

analyzing the plurality of alignment schemes based on quality of alignment of the two or more sets of three dimensional data as aligned with respect to each of the plurality of alignment schemes; and selecting an alignment scheme of the plurality of alignment schemes associated with a higher quality of alignment with respect to other alignment schemes of the plurality of alignment schemes.

16. The method of claim 15, the operations further comprising:

generating a merged set of three dimensional data based on the alignment scheme using the two or more sets of three dimensional data, wherein the merged set of three dimensional data comprises a merged set of three dimensional features based on combined three dimensional features of the two or more sets of three dimensional data.

17. The method of claim 16, the operations further comprising:

generating new alignment schemes between the merged set of three dimensional data and one or more other sets of three dimensional data of the plurality of sets of three dimensional data based at least on the geometric information for the merged set of three dimensional features.

18. A non-transitory computer-readable medium having instructions stored thereon that, in response to execution, cause a system including a processor to perform operations comprising:

obtaining two or more sets of three dimensional data, of a plurality of sets of three dimensional data, wherein the plurality of sets of three dimensional data comprise points in a three dimensional coordinate space, wherein the points are associated with three dimensional features, and wherein the two or more sets are associated with different capture positions relative to the three dimensional coordinate space;

generating a plurality of alignment schemes between two or more of the sets of three dimensional data based on the three dimensional data using a spatial transformation;

analyzing the plurality of alignment schemes based on quality of alignment of the two or more sets of three dimensional data as aligned with respect to each of the plurality of alignment schemes; and selecting an alignment scheme of the plurality of alignment schemes associated with a higher quality of alignment with respect to other alignment schemes of the plurality of alignment schemes.

19. The non-transitory computer-readable medium of claim 18, the operations further comprising:

generating a merged set of three dimensional data based on the alignment scheme using the two or more sets of three dimensional data, wherein the merged set of three dimensional data comprises a merged set of three dimensional features based on combined three dimensional features of the two or more sets of three dimensional data.

20. The non-transitory computer-readable medium of claim 19, the operations further comprising:

generating new alignment schemes between the composite set of three dimensional data and one or more other sets of three dimensional data of the plurality of sets of three dimensional data based at least on the geometric information for the merged set of three dimensional features.

\* \* \* \* \*